Jan. 27, 1925.
C. R. SHORT
1,524,215
UNIVERSAL JOINT
Filed May 19, 1922
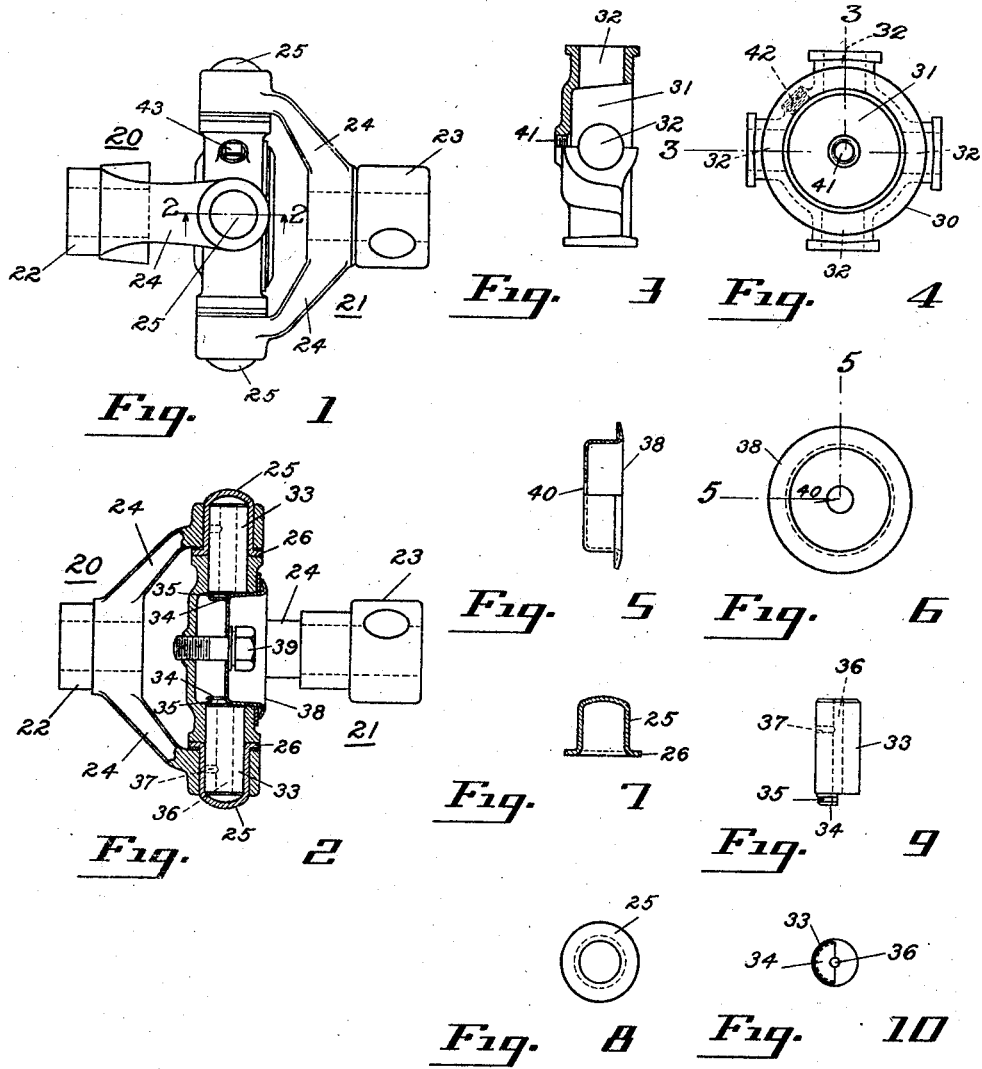

Patented Jan. 27, 1925.

1,524,215

UNITED STATES PATENT OFFICE.

CHARLES R. SHORT, OF DAYTON, OHIO, ASSIGNOR TO GENERAL MOTORS RESEARCH CORPORATION, OF DAYTON, OHIO, A CORPORATION OF DELAWARE.

UNIVERSAL JOINT.

Application filed May 19, 1922. Serial No. 562,180.

*To all whom it may concern:*

Be it known that I, CHARLES R. SHORT, a subject of the King of Great Britain, residing at Dayton, county of Montgomery, and State of Ohio, have invented certain new and useful Improvements in Universal Joints, of which the following is a full, clear, and exact description.

This invention relates to universal joints and one object of the present invention is to improve the method of construction of such connecting mechanism and to reduce to a minimum the total number of parts and the number of different parts required, thereby to facilitate assembling and to bring about economy of manufacture.

A further object is to improve the means for supplying lubricant to a universal joint, and for retaining the lubricant within the joint and for excluding dirt and dust from the joint.

Further objects and advantages of the present invention will be apparent from the following description, reference being had to the accompanying drawing, wherein a preferred form of embodiment of the present invention is clearly shown.

In the drawings:

Fig. 1 is a plan view of the assembled joint.

Fig. 2 is a sectional view taken on line 2—2 of Fig. 1.

Fig. 3 is a section view taken on line 3—3 of Fig. 4.

Fig. 4 is a side view of the spider.

Fig. 5 is a sectional view taken on line 5—5 of Fig. 6.

Fig. 6 is a side view of the retaining cup.

Fig. 7 is a section view of a thimble.

Fig. 8 is an end view thereof.

Fig. 9 is a side view of a pin; and

Fig 10 is an end view thereof.

Referring to the drawings, the joint includes yokes 20 and 21 having hubs 22 and 23 respectively adapted to be connected with shafts (not shown). Each yoke has arms 24 which are bored out at right angles to the axis thereof to receive thimbles 25 closed at their outer ends, said thimbles having flanges 26 which space the spider 30 from the arms of the yokes.

Spider 30 is provided with a central recess 31 and with four side holes 32 having their axes at right angles to each other and to the axis of the spider, and in the same plane and intersecting the axis of the spider.

In assembling the joint, the thimbles 25 are inserted in the arms and have preferably a press fit. The spider 30 is inserted between the flanges 26 of the thimbles, as shown in Fig. 2, and pins 33 are inserted one at a time within the recess 31 and each is moved radially outwardly into the holes 32 and thimbles 25. Each pin 33 is provided with a semicylindrical extension 34, which, when the pin is assembled projects into the recess 31 for a purpose to be described. Each extension 34 is provided with a semi-annular groove 35. Each pin 33 is provided with lubricant ducts 36 and 37.

After the pins 33 are assembled as shown in Fig. 2 a recess cover or retaining cup 38 is secured within the recess 31 by means of a screw 39 passing through hole 40 in said cup 38 and having engagement with a tapped hole 41 in spider 30. The recess 31 having previously been packed with grease the cup 38 serves also to retain such lubricant within the joint. By centrifugal force and capillary attraction this lubricant is caused to move out through passages 36 and 37 in pins 33 to lubricate the latter.

To disassemble the joint, the screw 39 and cup 38 are removed, and then the pins 33 are removed one at a time. Each pin is only slightly shorter than the mean diameter of the recess 31, hence it is necessary to turn a pin in pulling it out so that its extension 34 is located 180° away, in angular location, from the extension 34 of the opposite pin. Then before this first pin 33 clears the spider, its extension 34 will be brought alongside the extension of said opposite pin. The reason for providing extensions 34 with the grooves 35 is so that some instrument such as a screwdriver may be used to pry the pins out into the recess 31.

The spider 30 is provided with a tapped hole 42 which receives a plug 43. Lubricant may be introduced through this hole without disassembling the joint.

While the form of mechanism herein shown and described constitutes a preferred form of embodiment of the present invention, it is to be understood that other forms might be adopted, all coming within the scope of the claims which follow.

What I claim is as follows:

1. In a universal joint, the combination with yokes each having alined bearings closed at their outer ends; of a spider having a central recess and radially extending openings arranged in quadrature; pins insertable into said recess and extending respectively through said openings and into said bearings; and means for retaining said pins in position.

2. In a universal joint, the combination with yokes each having alined bearings closed at their outer ends; of a spider having a central recess and radially extending openings arranged in quadrature; pins insertable into said recess and extending respectively through said openings and into said bearings; and common means for retaining said pins in position.

3. In a universal joint, the combination with yokes each having alined bearings closed at their outer ends; of a spider having a central recess and radially extending openings arranged in quadrature; pins insertable into said recess and extending respectively through said openings and into said bearings; and a recess closing member for retaining said pins in position.

4. In a universal joint, the combination with yokes each having alined bearings closed at their outer ends; of a spider having a central recess and radially extending openings arranged in quadrature; pins insertable into said recess and extending respectively through said openings and into said bearings; a recess cover for retaining said pins in position; and means for detachably securing said cover to said spider.

5. In a universal joint, the combination with yokes each having alined bearings closed at their outer ends; of a spider having a cylindrical central recess and radially extending openings arranged in quadrature; pins insertable into said recess and extending respectively through said openings and into said bearings; a cup-shaped recess cover having a portion thereof projecting into said recess to retain the pins in position; and a screw extending through said cover and across said recess and having threaded engagement with said spider.

6. In a universal joint, the combination with yokes each having alined bearings closed at their outer ends; of a spider having a cylindrically central recess and radially extending openings arranged in quadrature; pins inserted into said recess and extending respectively through said openings and into said bearings, each pin being slightly less in length than the diameter of the recess and including a grooved portion extending into the recess, said pin extensions being preferably semi-cylindrical to permit withdrawal of a pin after its extension has been turned out of alinement with the extension of the opposite pin.

7. In a universal joint, the combination with yokes each having alined bearings closed at their outer ends; of a spider having a cylindrically central recess and radially extending openings arranged in quadrature; pins inserted into said recess and extending respectively through said openings and into said bearings, each pin having a duct for conducting lubricant from said recess to said bearings; and a spider recess cover attached to said spider to provide an enclosure for lubricant supply.

In testimony whereof I hereto affix my signature.

CHARLES R. SHORT.

Witnesses:
 Geo. E. Pasco,
 Wm. P. Pasco.